United States Patent [19]

Suzuki

[11] Patent Number: 4,793,206
[45] Date of Patent: Dec. 27, 1988

[54] AUTOMATIC TENSION REGULATING DEVICE FOR REMOTE CONTROL WIRE

[75] Inventor: Kazuhiro Suzuki, Nishinomiya, Japan

[73] Assignee: Nippon Cable System, Inc., Hyogo, Japan

[21] Appl. No.: 165,368

[22] Filed: Feb. 29, 1988

Related U.S. Application Data

[63] Continuation of Ser. No. 918,193, Oct. 14, 1986, abandoned.

[30] Foreign Application Priority Data

Mar. 7, 1986 [JP] Japan ................................. 61-51097

[51] Int. Cl.⁴ ................................................ F16C 1/10
[52] U.S. Cl. .................................. 74/501.5 R; 74/512; 192/111 A; 188/196 B
[58] Field of Search ............ 74/501.5 R, 500.5, 502.2, 74/502, 512, 501.6, 489, 502.6, 560; 188/2 D, 71.8, 79.5 K, 196 B; 192/111 A

[56] References Cited

U.S. PATENT DOCUMENTS

| 943,104 | 12/1909 | Strohkorb | 74/512 |
|---|---|---|---|
| 3,394,614 | 7/1968 | Zeidler | 74/512 X |
| 3,768,612 | 10/1973 | Gale | 192/111 A |
| 3,789,967 | 2/1974 | Dau et al. | 74/501.5 X |
| 4,066,154 | 1/1978 | Ross | 74/501.5 X |
| 4,304,322 | 12/1981 | Beccaris | 192/111 A |
| 4,378,713 | 4/1983 | Haskell et al. | 74/501.5 R |
| 4,379,500 | 4/1983 | Kamino | 74/512 X |
| 4,442,923 | 4/1984 | Wakatsuki et al. | 74/501.5 X |
| 4,448,090 | 5/1984 | Carré et al. | 192/111 A X |
| 4,456,101 | 6/1984 | Yamamoto et al. | 192/111 A X |
| 4,464,951 | 8/1984 | Courbot | 74/501.5 |
| 4,497,399 | 2/1985 | Kopich | 74/512 |
| 4,512,210 | 4/1985 | Gurney | 74/501.5 X |
| 4,543,849 | 10/1985 | Yamamoto et al. | |

FOREIGN PATENT DOCUMENTS

| 120616 | 10/1984 | European Pat. Off. . |
| 1163172 | 2/1964 | Fed. Rep. of Germany ... 188/196 B |
| 2743121 | 4/1979 | Fed. Rep. of Germany ... 192/111 A |
| WO84/01196 | 3/1984 | Int'l Pat. Institute . |
| 51-79268 | 6/1976 | Japan . |
| 52-21358 | 2/1977 | Japan . |
| 2037926 | 7/1980 | United Kingdom . |
| 2038439 | 7/1980 | United Kingdom . |
| 2130331 | 5/1984 | United Kingdom . |

Primary Examiner—Gary L. Smith
Assistant Examiner—Rodney M. Lindsey
Attorney, Agent, or Firm—Armstrong, Nikaido, Marmelstein & Kubovcik

[57] ABSTRACT

A device is placed between an end of a control wire which operates a clutch device of an automobile and an operating device, in order to automatically eliminate slack and excessive tension in the control wire. A first link is connected to the wire. A second link is connected to an operating device for linear movement relative to the first link. An adjusting spring is provided for resiliently urging the first link in a wire-pulling direction. A locking structure is provided for combining the two links with each other and releasing the combining state thereof when the operating device is situated at a region near a return-end-point.

5 Claims, 5 Drawing Sheets

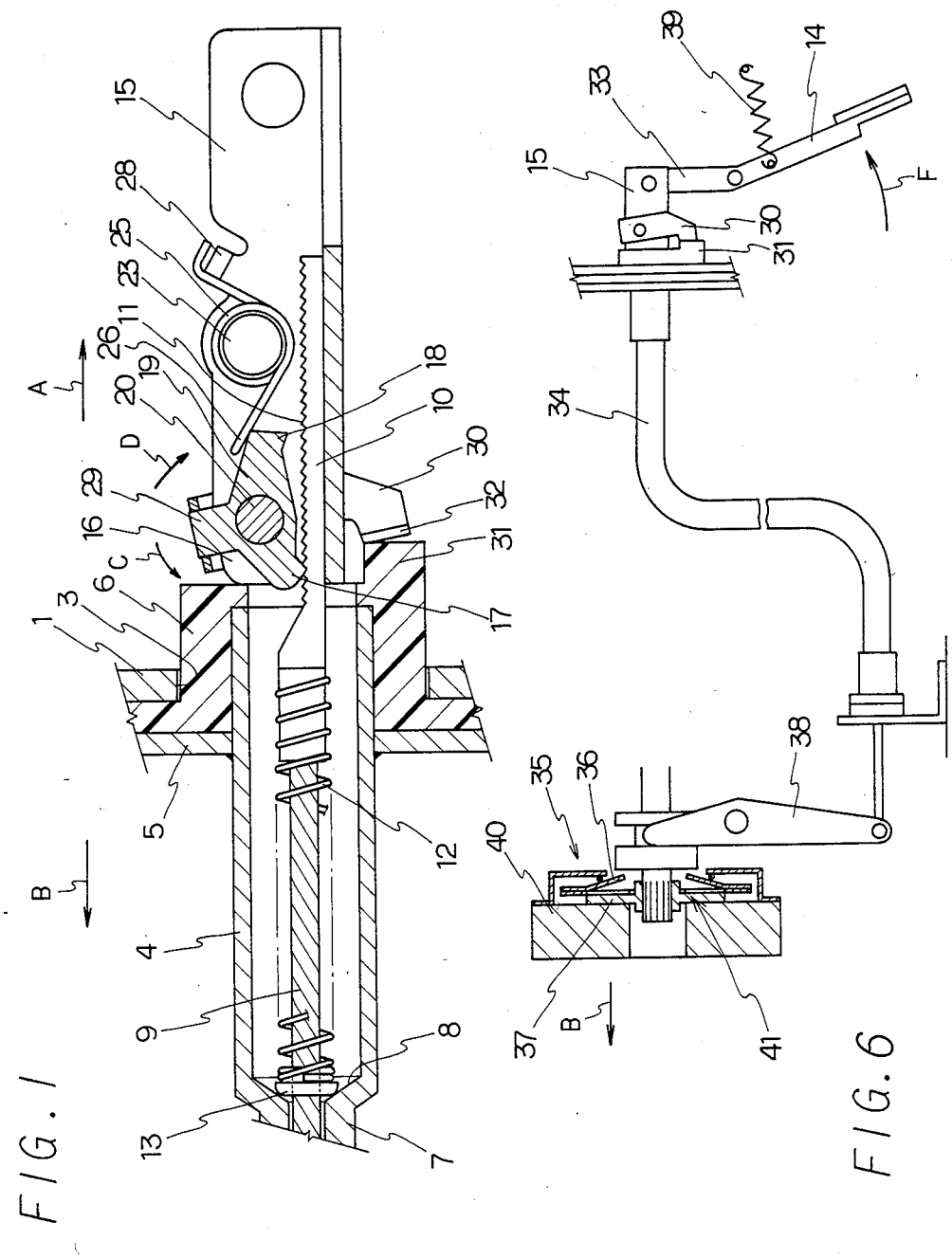

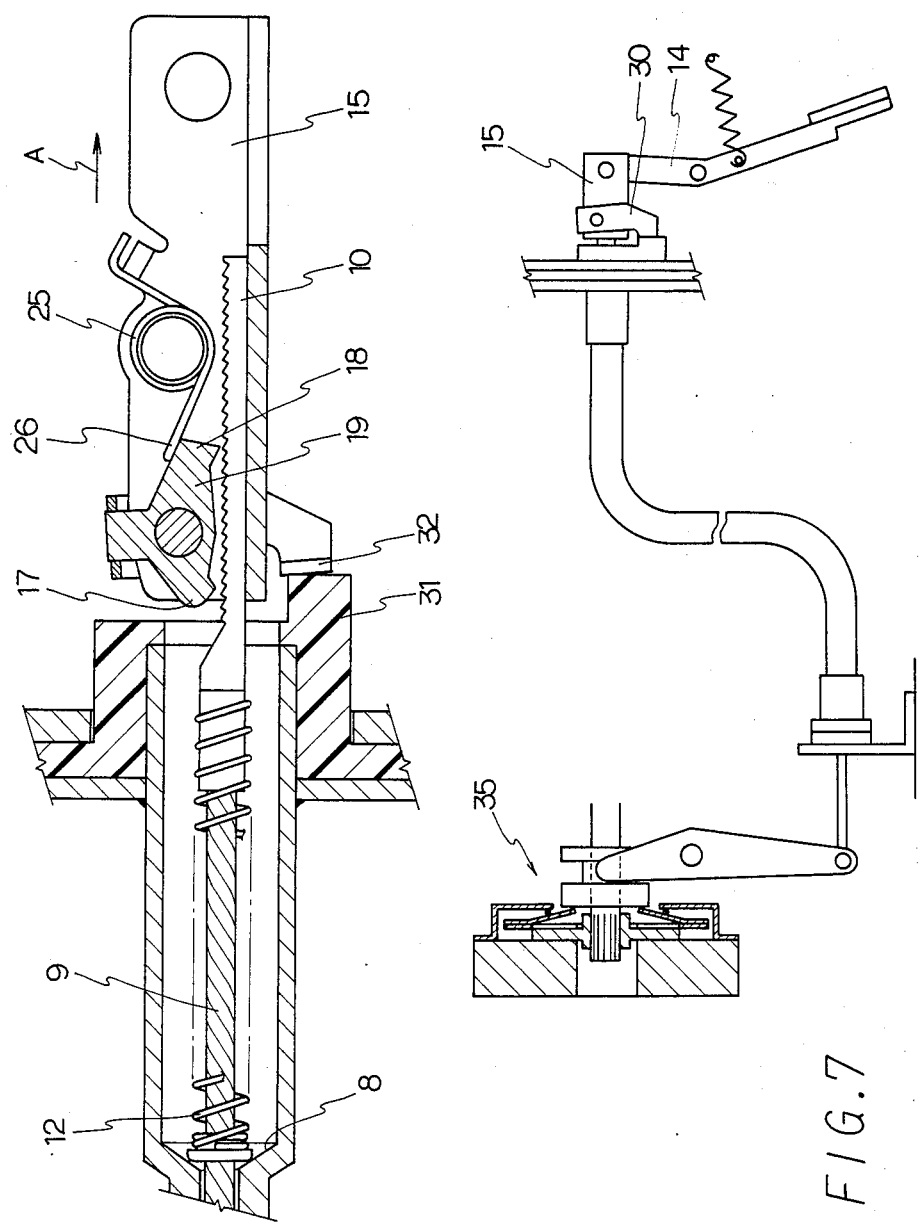

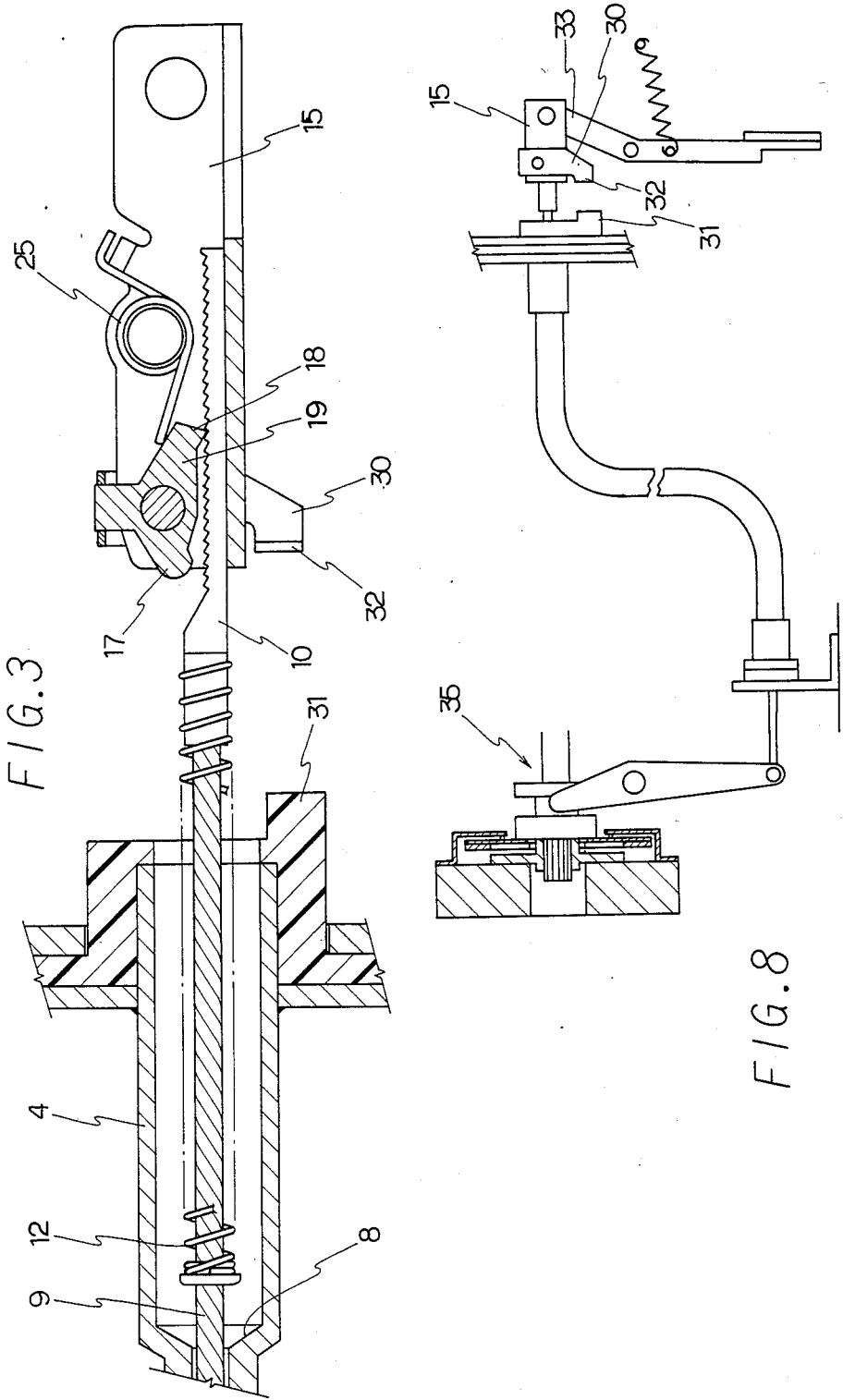

AUTOMATIC TENSION REGULATING DEVICE FOR REMOTE CONTROL WIRE

This application is a continuation of Ser. No. 918,193, filed 10/14/86, now abandoned.

BACKGROUND OF THE INVENTION

The present invention relates to an automatic tension regulating device for a remote control wire (hereinafter referred to as "tension regulating device"), and, more particularly, to a device which can automatically eliminate permanent elongation and excessive tension during operation of the wire, when the permanent elongation or excessive tension occurs in the remote control wire, whereby the tension of the wire is regulated so that the most suitable tension is normally applied to the wire.

Conventionally, a pull wire, a push-pull wire or an inner wire of a control cable (in this specification, those wires are generally referred to as "wire") has been widely used as a means for remotely controlling a clutch device or a brake device in an automobile, or the like. The wire usually comprises a strand of steel cords, synthetic resin cords, or the like.

The above-mentioned wire has an end connected to a driven member resiliently urged in the return direction by a return spring in a driven apparatus such as a clutch device or a brake device, and has another end connected to an operating means such as a clutch pedal or a hand lever. In general, the middle portion of the wire is guided with a set of pulleys rotatably mounted on a static member, for example, a frame or body of an automobile in order to change the path of the wire. Further, a wire is slidably inserted into a conduit and has both ends fixed to the above-mentioned static member. The mechanism is known as a control cable or Bowden cable. In the remote control mechanism arranged as mentioned above, when a wire-operating means is operated to pull the end of the wire, the motion is transmitted to the driven apparatus such as the clutch device through the wire. Therefore, the driven member in the driven apparatus is operated to be pulled against the urging force of the return spring. When the operational force pulling the wire is released, the driven member returns to an original position or return-point.

On the other hand, since the wire comprising a strand of steel cords or the like receives a repeated tension-and-relaxation operation over a long period, a permanent elongation gradually occurs in the wire. Therefore, the wire is loosened and the operational force cannot be accurately transmitted to the driven side.

In order to absorb such a permanent elongation of the wire, hitherto, various methods have been proposed. For example, a mechanism in which the wire is separated in a medium and two relatively rotatable pulleys are provided for winding each end of the separated wire has been known. In such a mechanism, when slack, due to permanent elongation, occurs in the wire, the pulleys are relatively shifted to rotate, and then, they are joined together, in order to directly adjust the effective length of the wire. Further, when the above-mentioned control cable is used, the effective length of the inner wire is usually indirectly adjusted by screwing an end-fitting of the conduit to linearly move them in the wire-extending direction in order to shorten or enlarge the length of the conduit.

In the above-mentioned devices, absorbing the elongation must be manually performed every time the elongation occurs in the wire. Therefore, if the above-mentioned general method is employed, the effort needed to absorb the elongation becomes very troublesome. In order to resolve such a problem, for example, Japanese Unexamined Utility Model Publications No. 79268/1976 and No. 21358/1977 disclose devices for automatically absorbing an elongation of a wire during the operation of the wire.

The conventional device is a means for absorbing the elongation of the wire with a one-way-clutch means having ratchet teeth and a pawl. That is to say, the conventional automatic elongation-absorbing device is constructed on the assumption that the wire is only gradually elongated, and it is not necessary to make the wire longer.

An elongation of the wire includes not only the above-mentioned permanent elongation, but also an elastic elongation which temporarily occurs in the wire only when the wire receives an external force, and returns to an original form after the external force is eliminated. Furthermore, an apparent elongation or slack occurs in the wire when a frame, or the like, along which the wire is arranged, is elastically deformed. Those elastic elongation and apparent elongation must not be absorbed since excessive tension occurs in the wire if the elastic or apparent elongation is eliminated. However, the above-mentioned conventional automatic elongation-absorbing device disadvantageously absorbs not only the permanent elongation, but also the elastic or apparent elongation in the wire, since the devices absorbs all generated elongation without distinction of the cause thereof. Further, excessive tension which occurs in the wire, for example, by absorbing the elastic elongation, cannot be automatically eliminated. For example, when one of the above-mentioned automatic elongation-absorbing devices is applied to a control cable for a clutch-operating device in an automobile, the device absorbs an apparent elongation of the wire due to deformation of a chassis or a body of the automobile during operation of the vehicle. Also, the device absorbs an elastic elongation of the wire due to an overload applied to the inner wire during manual operation, and the like.

As a result, excessive tension occurs in the inner wire, and further, two clutch plates opposited to each other are always incompletely engaged with each other, and therefore, the clutch plates will burn due to friction. Further, when one of the devices is applied to a control cable used in a brake device, the brake device always acts due to the above-described excessive tension, so that the brake linings will burn.

On the other hand, after the clutch plate of the clutch device or the brake lining of the brake device is gradually worn away, since the effective length of the wire becomes insufficient, excessive tension is applied to the inner wire, for example, when a clutch pedal is operated. Therefore, it is necessary to adjust the length of the inner wire to make it longer.

With respect to an automatic tension regulating devices which can automatically lengthen the wire to eliminate excessive tension in the wire, for example, No. EP-A-120616, U.S. Pat. No. 4543849 and WO No. 84/01196 have disclosed several devices.

However, the above-mentioned devices are for adjusting tension of a control wire by adjusting an effective length of a conduit of a control cable, and therefore, they cannot be applied to a device in which only a control wire is used without a conduit. Further, in the above-mentioned conventional devices, an adjusting spring makes the effective length of the conduit long, i.e. to shorten the effective length of the inner wire when the operating means returns to the original position. Therefore, an urging force of the adjusting spring cannot be offset or balanced with the reversely urging force of the return spring for the operating means itself since there is no connection between the adjusting spring and the operating means side at the original position i.e. return-point. Therefore, an excessive load is applied to the return spring of the operating means in the original return-point. In addition, the urging force of the adjusting spring cannot be sufficiently enlarged due to the above-mentioned excessive load.

The main object of the present invention is to provide an automatic tension-regulating device for a control wire, which can be employed for a control wire without a conduit, as well as for a control cable with a conduit.

Another object of the present invention is to provide an automatic tension-adjusting device in which a connection between a control wire and an operating means side is kept even if in the return-point of the operating means, and therefore, an excessive and useless load in the return spring of the driven device can be reduced, and the urging force of the adjusting spring can be sufficiently enlarged.

Another object of the present invention is to provide an automatic tension-regulating device for a control wire, which is simplified in structure and can be securely operated.

SUMMARY OF THE INVENTION

According to the present invention, there is provided an automatic tension regulating device to be put between a control wire having an end jointed to a reciprocally movable driven member resiliently urged in a return-direction by a return spring and a means for operating the wire the automatic regulating device comprises:

(a) a first link, e.g. a rack 10 shown in FIG. 1, jointed to the other end of the wire;

(b) a second link, e.g. a connecting member 15 shown in FIG. 1, provided for linear movement in a wire-operating direction i.e. wire-extending direction relative to the first link and jointed to the wire-operating means;

(c) an adjusting spring for resiliently urging the first link in the wire-pulling direction at least when the wire-operating means is positioned in a region between a return-point and a point near the return point; and (d) a locking means operatively connecting said first and second links with each other so that an engagement between the first and second links is always kept, but is temporarily released when the wire-operating means is positioned within a region near the return-point.

In the above-mentioned device of the present invention, the first link and the second link are always engaged with each other except when the operating means is situated within the region near the return-point, i.e. when the engagement of the locking means is temporarily released. Accordingly, in a normal state, an operation of pulling or releasing of the operating means is transmitted to the wire via the second link and the first link, and therefore, the driven member can be pulled against the urging force of the return spring and can be returned by the urging force of the return spring.

On the other hand, when the engagement of the locking means is temporarily released, the first link and the second link are relatively movable to each other. Therefore, if there is a permanent elongation in the wire when the locking means is released, the first and second links are relatively moved to shorten the effective length of the wire by the function of the adjusting spring, and after the locking means is engaged again, the permanent elongation of the wire is already absorbed.

Further, if there is excessive tension in the wire in that period, the first and second links are relatively moved to elongate the effective length of the wire during the period that the engagement of the locking means is released, and therefore, the excessive tension in the wire is cancelled.

When there is neither permanent elongation nor excessive tension in the wire, even if the engagement of the locking means is released, the locking means is in the condition that a suitable tension is maintained in the wire.

The above-mentioned lock-releasing function of the locking means is performed twice every reciprocal cycle of the wire, e.g. just after the operating means, such as a clutch pedal, starts operating and just before the operating means is completely returned to the original resting position. Therefore, the wire is always automatically maintained in a suitable tension condition and a maintenance-free device is achieved.

Though preferable embodiments of the device of the present invention will be described hereinafter with reference to accompanying drawings, the present invention is not limited to such embodiments.

BRIEF DESCRIPTION OF THE DRAWINGS

FIG. 1 is a longitudinal sectional view showing an embodiment of the device of the present invention;

FIGS. 2 and 3 are longitudinal sectional views of the device shown in FIG. 1, in operating states, respectively;

FIGS. 6 to 8 are diagrams illustrating the operating states of a clutch-operating device having the device shown in FIG. 1, respectively;

DETAILED DESCRIPTION OF THE INVENTION

Figure 5:
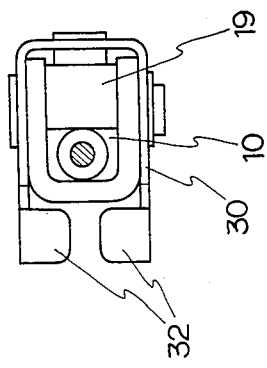
FIG. 5 is a sectional view obtained along line X—X in FIG. 4.

In FIG. 1, numeral 1 shows a static member, e.g. a chassis of an automobile, in which an aperture 3 is formed. An end of a tubular member 4 is inserted into the aperture 3 so that the tubular member 4 extends clutch-side, i.e. in the direction of Arrow B. The end of the tubular member 4 is securely fixed to the static member 1 by means of a flange 5 thereof. The tubular member 4 is provided with a tubular elastomeric member 6 made of a rubber, or the like, on the periphery of an end thereof. The tubular member 4 has a necked portion 7 where the inner diameter is narrow so that a step portion 8 is a stopper for a compression spring 12. The necked portion 7 is formed at the other end of the tubular member 4.

A wire 9 is inserted into the tubular member 4, and a rack 10, which is a first link, is securely connected to an end of the wire 9 so that the rack 10 extends in the wire-extending direction. The rack 10 has a series of ratchet teeth 11 on the upper surface thereof as a series of engaging teeth, and each tooth has a gentle slope surface on a free-end side of the rack 10. That is to say, the engaging teeth can engage with claws 17, 18 as mentioned later when the rack 10 is pulled through the wire 9, i.e. in the direction of Arrow B. Further, a compression spring 12 has one end securely fixed to the rack 10 and has the other end free. The spring 12 is contained in the tubular member 4 so that the compression spring 12 surrounds the wire 9. The compression spring 12 functions as an adjusting spring.

Though the free end of the compression spring 12 can always abut against the step portion 8, it is preferable, as shown in FIG. 1, that the length of the compression spring 12 is so short that the end of the compression spring 12 temporarily abuts against the step portion 8 only when an adjusting force is required, i.e. the wire 9, the rack 10 and the like are positioned at the region near the original return-point. In such a preferable case, there can be obtained an advantage that the load in the clutch device side is lightened.

On the free end of the compression spring 12 shown in FIG. 1, a ring 13 made of synthetic resin, or the like, is fixed to reduce a frictional force and to reduce wear between the compression spring 12 and the wire 9 due to the frictional slide motion.

The free end side (right-handed side in FIG. 1) of the rack 10 is slidably inserted into a connecting member 15. The connecting member 15 has a C-shaped cross section and has an end rotatably connected with a clutch pedal (shown with numeral 14 in FIG. 6). The connecting member 15 is a second link in the embodiment.

The connecting member 15 is provided with a escapement member 19 which is rotatably supported by means of a pin 20, or the like, at the free end 16 side (left-handed side in FIG. 1) thereof. The escapement member 19 has two claws 17 and 18 on the lower side thereof so that the claws can alternatively engage with the ratchet teeth 11.

The claws 17, 18 of the escapement member 19 are arranged so that one of the claws can engage with a tooth of the ratchet teeth 11 when the escapement member 19 is rotated in one direction, and the other claw engages with another tooth of the ratchet teeth 11 when the escapement member 19 is rotated in the other direction. In FIG. 1, the claw 17 engages with a tooth when the escapement member 19 is rotated in the direction of Arrow C, and the claw 18 engages when the escapement member 19 is rotated in the direction of Arrow D. Further, the escapement member 19 is resiliently urged to rotate in the direction of Arrow D by means of an arm 26 of a torsional coil spring 25 which is an engagement spring. The torsional coil spring 25 is supported by embossing portions 23, 24 which project inwardly from both side walls 21, 22 of the connecting member 15 as shown in detail in FIG. 4. The other arm 27 of the torsional coil spring 25 is engaged with an engaging projection 28 which is formed by bending a part of the side wall 22.

Figure 4:
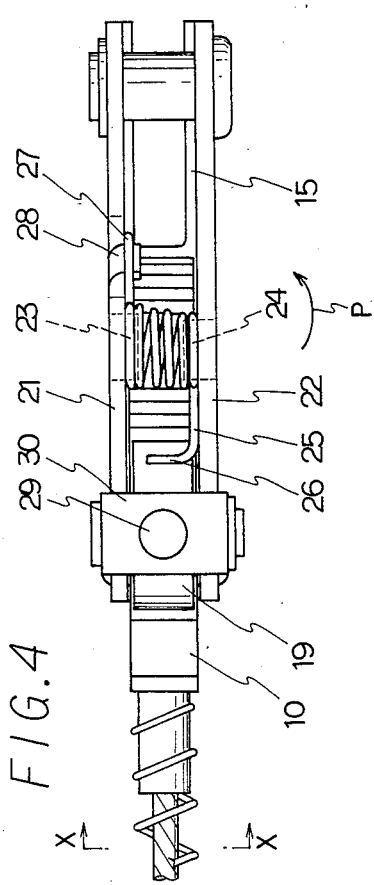
FIG. 4 is a plan view of the device shown in FIG. 1.

If the two embossing portions 23, 24 are concentrically arranged, the torsional coil spring 25 tends to lean in the direction of Arrow P by means of a reaction force thereof. Therefore, it is preferable that the embossing portions 23, 24 are arranged with relatively shifted state with each other, as shown in FIG. 4, by an estimated degree in eccentricity. As a result of the shifted state, the arm 26 of the coil spring 25 tends to straightly, i.e. without lean, urge the escapement member 19.

The escapement member 19 has a pin 29 upwardly projecting from the upper portion thereof.

An arm member 30 for releasing the locking or engagement between the claws 17, 18 and the ratchet teeth 11 has an upper end portion which is securely fixed on the pin 29. Further, the arm member 30 is provided with an abutting portion 32 at the lower end portion thereof. The abutting portion 32 is to abut against a stopper 31 which is a projecting portion formed on the tubular elastomeric member 6.

The ratchet teeth 11, the escapement member 19, the torsional coil spring 25, the arm member 30 and the stopper 31 collectively construct a locking means.

Instead of the above-mentioned series of ratchet teeth 11, other shaped engaging teeth can be used in the locking means where each tooth has an equilateral triangle shape in cross section.

However, it is preferable that the series of ratchet teeth 11, in which each tooth has a gentle slope in the free-end side of the rack 10, i.e. in which the direction that the rack 10 and the connecting member 15 are relatively pulled from each other is an engaging direction thereof, is used as in the device shown in FIG. 1. In that case, in addition to the urging force in the direction of Arrow D of the torsional coil spring 25, a smooth lock-releasing portion action occurs between the claw 17 and the ratchet teeth 11 even if the clutch pedal 14 is pressed a little to disconnect the abutting portion 32 from the stopper 31. This is especially true even if the clutch pedal 14 is suddenly depressed, the lock-releasing action is smooth.

The automatic tension-adjusting device constructed as mentioned above is installed on an operational side of a clutch-operating mechanism, for example, as shown in FIG. 6, so as to be set between the end portion of the wire 9 and the end portion 33 of the clutch pedal 14.

In FIG. 6, a conduit 34 slidably guides the wire 9. The conduit is an element of a control cable (Bowden cable) as well as the wire 9. However, the device of the present invention can be employed not only in a mechanism in which a control cable is used, but also in a mechanism comprising a general wire which is turned or slidably guided by pulleys, cable-guides, or the like.

The numeral 35 in FIG. 6 shows a conventional clutch mechanism comprising a clutch disk 37, a return diaphragm spring 36 normally urging the clutch disk 37 in the direction of Arrow B, and a lever 38 for moving the clutch disk 37 in the counter direction of Arrow B. Another return spring 39 is provided on the clutch pedal 14.

Hereinafter, a function of the above-mentioned automatic tension-adjusting device will be explained with reference to FIGS. 1 to 3 and FIGS. 6 to 8. FIG. 1 and FIG. 6, FIG. 2 and FIG. 7, and FIG. 3 and FIG. 8 are in the relationship showing a part by the former and a whole by the latter, respectively.

First, when the clutch pedal 14 is not yet pressed down, as shown in FIG. 1 and FIG. 6, the clutch disk 37 stops at a position where the clutch disk 37 abuts against a driven member 40 such as a fly wheel since the return spring or diaphragm spring 36 pushes the clutch disk 37 in the direction of Arrow B. In that state, the wire 9 does not substantially receive any load.

As shown in FIG. 1 and FIG. 6, the abutting portion 32 of the arm member 30 abuts against the stopper 31, and the escapement member 19 is rotated in the direction of Arrow C against the urging force in the direction of Arrow D of the torsional coil spring 25. Therefore, the claw 17 and one tooth of the ratchet teeth 11 are engaged with each other. Further, the compression spring 12 is also compressed since the ring 13 is pressed against the step portion 8 of the tubular member 4.

In the above-mentioned state, a small pressure force is applied in the wire 9 with the claw 17 of the escapement member 19, and the release bearing 41 and the return diaphragm spring 36 are not in contact with each other keeping a small clearance between each other.

Next, as shown in FIGS. 2 and 7, when the clutch pedal 14 is started to be depressed in order to disengage the clutch 35, the connecting member 15 starts to move in the direction of Arrow A (in FIG. 2). According to the movement of the connecting member 15 in the direction of Arrow A, the arm member 30 is gradually rotated in the direction of Arrow D (in FIG. 1) by the torsional coil spring 25 since the abutting portion 32 becomes free from the stopper 31. Accordingly, claw 17 which is engaged with the ratchet teeth 11 starts to be disengaged from the ratchet teeth 11, and thereafter, another claw 18 will engage with the ratchet teeth 11.

In the course of the rotation of the escapement member 19, there occurs a state in which neither claws 17, 18 engage with the ratchet teeth 11, and the rack 10 and the connecting member 15 are not engaged with each other, i.e. the relatively movable state, occurs.

The tension-regulating function of the device of the present invention is performed during the period when neither claw is engaged. That is to say, if there is a permanent elongation in the wire that loosens the wire, the compression spring 12 pushes the rack 10 in the direction of Arrow A so as to enlarge the superimposed area between the rack 10 and the connecting member 15 during the above-mentioned relatively movable state. Accordingly, the effective length of the wire 9 is shortened to compensate for the permanent elongation of the wire.

On the contrary, if there is an excessive tension in the wire 10, the rack 9 is pulled by means of the excessive tension against the urging force of the compression spring 12 in the direction of Arrow B during the relatively movable state, and then, the superimposed area between the rack 10 and the connecting member 15 is reduced. That is to say, the effective length of the wire 9 is extended to eliminate the excessive tension in the wire 9.

After the tension of the wire is adjusted to the most appropriate state, the claw 18 and the ratchet teeth 11 engage with each other as shown in FIG. 3 and FIG. 8, and the rack 10 and the connecting member 15 are locked so that they move together as one body. After they are connected again, the operation is the same as the conventional operational manner.

When the force that depresses the clutch pedal 14 is released so that the clutch disc 36 is connected with a fly wheel, i.e. a driven member 40 again, the operation goes in the reverse order, i.e. from FIG. 3 to FIG. 1 via FIG. 2 and another tension-adjusting function in the wire is effected again at the position shown in FIG. 2 just before the clutch pedal 14 is returned to the original position, i.e. the position shown in FIG. 1. In the above-mentioned state, the compression spring 12 acts as a shock-absorber capable of receiving an impulsive rotational movement in the direction of Arrow F (in FIG. 6) of the clutch pedal 14 when the compression spring 12 has an effect.

In the device of the present invention, an adjusting spring having a strong urging force can be employed, since the first link, e.g. the rack 10, and a second link, e.g. the connecting member 15 are engaged with each other after the operation means, e.g. clutch pedal 14 is returned to the original position. Therefore, the above-mentioned on-off operation of the clutch device 35 becomes more smooth.

Further, when the mechanism of the device of the present invention is constructed in such a manner that almost all mechanism can be contained in the links, e.g. the connecting member 15, the device can be designed in a compact shape, for example, ⅔ in length, ⅔ in width and ½ in weight in comparison with a conventional device, and can be manufactured with low cost.

Further, in the mechanism of the present invention, the force of the compression spring 12 can be offset or balanced with the force of the return spring 39 of the clutch pedal 14, since the first link and the second link are locked with each other after the operating means such as the clutch pedal returns to the original position. Therefore, the return diaphragm spring 36 of the clutch 35 does not receive any excess or useless load.

Figure 9:
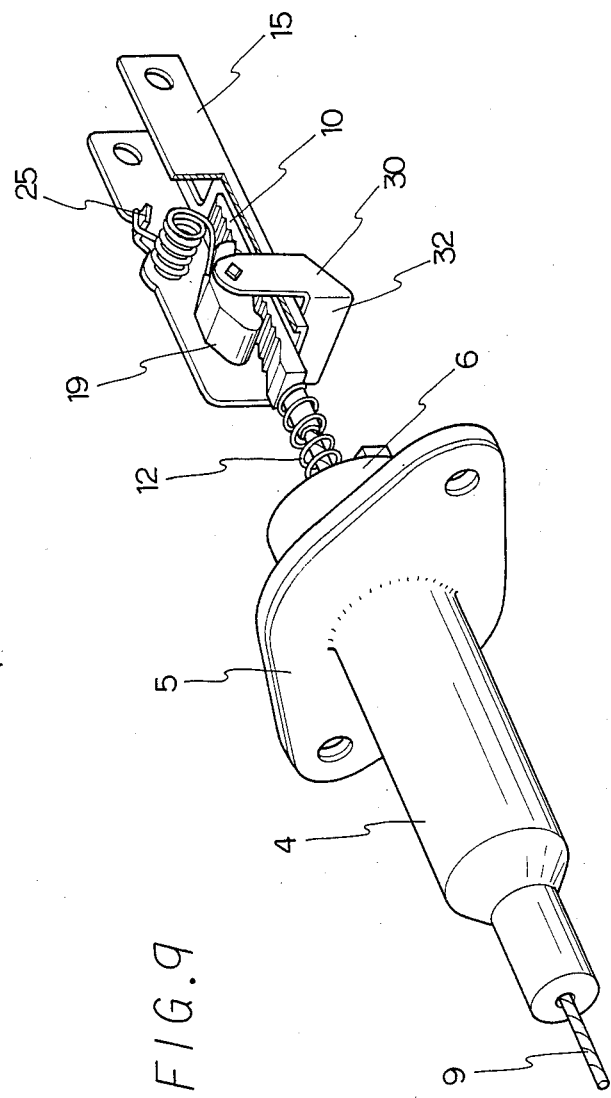
FIGS. 9 and 10 are partially cut-away perspective views showing another embodiment of the device of the present invention.

In another embodiment of the device of the present invention shown in FIG. 9, the engagement between the escapement member 19 and the arm member 30 or the lock-releasing lever are performed by inserting square-shaped shaft-ends into the side plates of the arm member 30. In the case, this abutting portion can be formed as a continuous plate.

Figure 10:
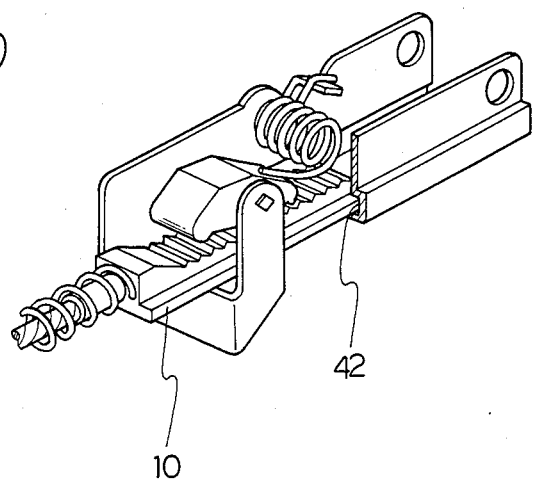

In the device shown in FIG. 1, since the rack 10 is inserted between two claws 17, 18 and a lower plate of the connecting member 15, there is no need to provide any guide for the rack 10, and this is one of the advantages in the present invention. However, if desired, a guide 42 for the rack 10 can be provided on a connecting member 15, as shown in FIG. 10.

In the present invention, instead of a compression spring, a tension spring can be used as an adjusting spring, and further, a leaf spring or the like can be employed as the adjusting spring.

Figure 11:
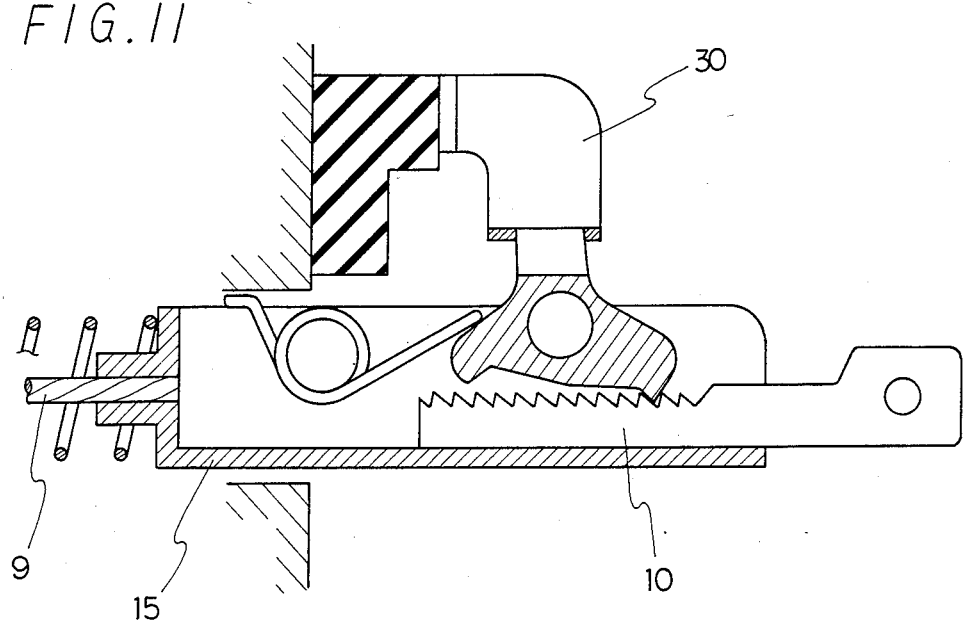
FIG. 11 is a longitudinal sectional view showing a further embodiment of the present invention.

FIG. 11 shows another embodiment of the device of the present invention, in which a first link is constructed with a connecting member 15 jointed to a wire 9 side, and a second link is constructed with a rack 10. In this case, the arm 30 is extended in a counter direction in comparison with the device shown in FIG. 1.

Though preferable embodiments of the invention are described above, it is to be understood that the present invention is not limited to the above-mentioned embodiments, and various changes and modifications may be made in the invention without departing the spirit and the scope thereof.

What we claim is:

1. An automatic tension regulating device for placement between a control wire and a wire-operating means for operating said control wire, said automatic tension regulating device comprising:
   a first link means connected to an end of said control wire, said first link means extending in a wire-operating means direction, said first link means having an upper surface and a series of ratchet teeth on said upper surface;
   a second link means for providing linear movement of the first link means in the wire-operating means direction, a first end of said second link means being connected to said first link means, a second end of said second link means being connected to said wire-operating means;

a locking means for sequentially releasably connecting—disconnecting—reconnecting said first and second link means with each other when said wire-operating means is moving adjacent a return point, said locking means comprising, a pin attached to said second link means, an escapement member rotatively supported by said pin, said escapement member extending along said upper surface of said first link means and being provided on said second link means, said escapement member having opposite ends and a claw at each end for alternately engaging with said ratchet teeth, said escapement member having an upward projecting pin, an engagement spring resiliently urging said escapement member to rotate in a first direction such that one of said two claws engages said ratchet teeth, and an arm member rotatably mounted on said pin and fixed to said upward projecting pin of said escapement member, wherein when said wire-operating means is operated, said second link means moves in the wire-operating means direction causing said arm member to rotate, said rotation of said arm member causes said escapement member to disengage from said ratchet teeth during the course of rotation, such that linear movement of said first and second link means is possible relative to each other causing said control wire to move in either of a wire-shortening direction and a wire-lengthening direction, movement in said wire-shorting direction causing said first link to move in a direction opposite the wire-operating means direction and movement in said wire-lengthening direction causing said first link means to move in the wire-operating means direction; and an adjusting spring for resiliently urging said first link means in a wire-operating means direction at least during a period when said locking means releases connection between said first and second link means.

2. The device of claim 1 wherein said ratchet teeth are capable of engaging in such direction that said wire-operating means is operated to be pulled.

3. The device of claim 1 wherein said arm member laterally projecting relative to said wire-operable direction and being fixed to said escapement member so that said arm member and said escapement member rotate together, and said device further comprising a static stopper for abutting against said arm member when said wire-operating means is positioned between a position near said return point and said return point.

4. The device of claim 3 wherein said stopper is made of a rubber-like elastomeric material.

5. The device of claim 1 wherein said adjusting spring is a compression spring having an end securely fixed to said first link and another end being free and extending toward a wire-return direction; and a ring is stationally provided for abutting against said another end of said compression spring when said wire-operating means positions between a position near said return point and said return point.

* * * * *